Patented Dec. 1, 1953

2,661,356

UNITED STATES PATENT OFFICE 2,661,356

SEPARATION OF BILE ACIDS

Robert H. Sifferd, Joliet, Ill., assignor, by mesne assignments, to Armour and Company, Chicago, Ill., a corporation of Illinois No Drawing. Application June 13, 1951, Serial No. 231,439

8 Claims. (Cl. 260—397.1)

This invention relates to the separation of bile acids. The invention is particularly useful in the separation of cholic acid and desoxycholic acid from the total acid precipitate of saponified bile.

As is well known, desoxycholic acid forms with xylene and many other organic substances, characteristic coordination compounds which are useful, and in fact almost unavoidable, in the separation and purification of desoxycholic acid from natural sources. Most of the available methods for the isolation of desoxycholic acid involve the co-precipitation of cholic acid and desoxycholic acid, followed by the extraction of the desoxycholic acid from the much larger cholic acid fraction by the use of suitable solvents in which desoxycholic acid has a greater solubility than does cholic acid.

I have observed what appears to be a significant difference in the dissociation of cholic acid relative to that of desoxycholic acid and find it possible to take advantage of the apparent dissociation difference to achieve a separation of these two important bile acids with large yield and in substantially a continuous procedure.

An object of the present invention is to provide a process in which desoxycholic acid is precipitated almost quantitatively and selectively by simple adjustment of hydrogen-ion concentration. A further object is to provide a process in which, after the separation of desoxycholic acid, cholic acid is separated almost quantitatively and selectively by simple adjustment of hydrogen-ion concentration. A still further object is to provide a continuous process in which desoxycholic acid and cholic acid are separated successively by adjustment of hydrogen-ion concentration to effect separate crystallization of the two acids. Yet another object is to provide a new process by which the above two important bile acids are separated at a minimum of expense and in very simple process steps. Other specific objects and advantages will appear as the specification proceeds.

In spite of the fact that the desoxycholic acid content of bile is invariably smaller than the cholic acid content, I find it practical by the method I am about to describe to precipitate desoxycholic acid almost quantitatively and selectively by simple adjustment of hydrogen-ion concentration. After removal of the desoxycholic acid by filtration, cholic acid can also be precipitated without other handling than the adjustment of hydrogen-ion concentration.

I achieve this result by dissolving the crude mixed bile acids in aqueous alkaline solution at a concentration preferably in the range of 15–25% solids. To this solution of bile acid salts is added about 5–25% of an alcohol or ketone, together with sufficient non-polar, volatile organic compound to form a coordination compound with the desoxycholic acid present in the mixture. Acid is then added slowly and with vigorous agitation to approximately pH 6.0 or until crystallization has started, whichever occurs first. Acidification is discontinued until the pH has come to equilibrium due to crystallization of the desoxycholic acid coordination compound which is removing hydrogen ions from solution. Further acidification produces little change in the hydrogen-ion concentration, once the crystallization is well under way, since the precipitating bile acid is removing hydrogen-ion approximately as fast as it is added. Addition of mineral acid is continued as long as the pH remains constant and from 0.1 to 0.2 pH unit beyond that plateau level to insure complete precipitation of the desoxycholic acid coordination compound. The crystalline material is removed by filtration, centrifugation or other suitable means, and the mother liquor treated with additional acid to precipitate the cholic acid from the solution.

The cholic acid fraction shows a behavior similar to that exhibited by the desoxycholic, the pH level remaining stable during the crystallization of the cholic acid. By discontinuing acidification a few tenths (.1 to .2 pH) of one pH unit beyond the plateau level of the cholic acid, it is possible also to leave in solution almost all the accompanying tarry impurities and fatty acid impurities.

In adjusting the pH in the above steps, mineral acid or any other suitable acid may be used.

The non-polar, volatile organic substances added for forming a coordination compound with the desoxycholic acid in the mixture may be benzene, toluene, xylene, monochlorobenzene, the dichlorobenzenes, and many aliphatic hydrocarbons. Since such non-polar substances are well known in the art for producing such co-

Example 1

500 kilograms crude mixed bile acids are dissolved in 2500 liters of water by the addition of 50 kilograms of sodium hydroxide. To this solution is added 250 liters of tertiary butyl alcohol and 100 liters of xylene. The temperature of the mixture is adjusted to 45° C. and sulphuric acid is added to pH 6.3 with vigorous agitation. The mixture is seeded by the addition of a small amount of crude desoxycholic acid-xylene coordination compound to induce crystallization of the desoxycholic acid fraction. Agitation is continued with cooling to room temperature until pH equilibrium is reached at pH 6.8. Slow acidification with sulphuric acid is continued at room temperature until the mixture is maintained at pH 6.6. The crystalline disoxycholic acid after cooling is separated in a basket centrifugation. The mother liquid is warmed to 50° C. and acidification with sulphuric acid continued with agitation to pH 5.8. Crystallization is induced by seeding and pH equilibrium established at pH 5.9. The mixture is cooled to room temperature and acidification with sulphuric acid is resumed and continued to pH 5.6. The precipitate of cholic acid hydrate is collected by filtration or other means.

Example 2

200 kilograms crude desoxycholic acid-xylene coordination compound, containing approximately 25% cholic acid, is dissolved in 600 liters of water by the addition of 20 kilograms of sodium hydroxide. To this solution is added 70 liters of tertiary butyl alcohol and 20 liters of xylene. The temperature of the mixture is adjusted to 45° C. and sulphuric acid is added with vigorous agitation to pH 7.3. Crystallization takes place at this pH and continues without further addition of acid, the pH meanwhile drifting to 7.4. After pH equilibrium has been established at this level, additional sulphuric acid is added slowly and with continued mixing until the mixture is maintained at pH 7.0. The suspension of desoxycholic acid compound is cooled to room temperature and the solids collected by centrifugation. The mother liquor is warmed to 50° C. and is adjusted to pH 4, permitting the cholic acid to crystallize. The mixture is cooled to room temperature and the cholic acid hydrate collected by filtration.

Example 3

The process was carried through as described in Example 2, except that methyl iso-butyl ketone was employed instead of tertiary alcohol, and comparable results were obtained.

Example 4

The process of Example 1 was carried out, except that benzene was substituted by xylene, and comparable results obtained.

The water-soluble salts of cholic and desoxycholic acids may be formed by adding alkalis salts such as sodium, potassium or lithium hydroxides, by adding ammonia or ammonium hydroxide, etc.

By "non-polar" is meant a non-electrolyte and an organic compound, the atoms of which are held in electromagnetic union by sharing a common pair of electrons. Thus alcohol, ketones, acids, and bases are polar substances, while benezne, xylene, toluene, chlorobenzene, dichlorobenzene and the volatile aliphatic hydrocarbons are non-polar substances. As above stated, non-polar substances are well known in connection with their ability to form coordination compounds with desoxycholic acid.

While in the foregoing specification I have set out specific steps and treating substances in considerable detail for the purpose of illustrating embodiments of the invention, it will be understood that such details may be varied widely by those skilled in the art without departing from the spirit of my invention.

I claim:

1. In a process for separating desoxycholic acid from an aqueous alkaline solution of cholic and desoxycholic acids in which a non-polar volatile organic substance is added to form a coordination compound with the desoxycholic acid in the solution, the steps of acidifying the mixture until crystallization of the desoxycholic coordination compound begins, maintaining the pH against further substantial drop until the bulk of the desoxycholic acid crystallizes, and separating the crystallized desoxycholic acid.

2. In a process for separating desoxycholic acid from an aqueous alkaline solution of cholic and desoxycholic acids in which a non-polar volatile organic substance is added to form a coordination compound with the desoxycholic acid in the solution, the steps of acidifying the mixture until crystallization of the desoxycholic coordination compound begins, continuing the addition of acid until an equilibrium of the pH is established and until the pH is from about .1 to about .2 below the equilibrium level, and separating the resulting crystallized desoxycholic acid.

3. In a process for separating desoxycholic and cholic acids from a mixture thereof in which from about 5 to 25% of an agent selected from the group consisting of alcohol and ketone is added to an aqueous solution of water-soluble salts of cholic and desoxycholic acids and in which a non-polar volatile organic substance is added to form a coordination compound with the desoxycholic acid in the mixture, the steps of acidifying the mixture until crystallization of the desoxycholic acid coordination compound begins, and maintaining the pH of the mixture against further substantial drop until the bulk of the desoxycholic acid crystallizes.

4. The process of claim 3, in which acid is added after crystallization of the desoxycholic coordination compound begins until an equilibrium is established and until the pH is from .1 to about .2 below the equilibrium level, and separating the resulting crystallized desoxycholic acid.

5. The process of claim 4, in which after the separation of desoxycholic acid, acidification is continued until crystallization of the cholic acid begins, and then maintaining the pH against further substantial drop until the bulk of the cholic acid is crystallized.

6. The process of claim 4, in which after the separation of the desoxycholic acid, acidification is continued until crystallization of the cholic acid begins, and then after a pH equilibrium has been established, continuing the acidification until the pH reaches about .1 to .2 below said equilibrium level, and finally removing the crystallized cholic acid.

7. The process of claim 4, in which the mixture is seeded with desoxycholic acid coordination compound material.

8. In a process for separating desoxycholic acid from an aqueous alkaline solution of cholic and desoxycholic acids in which a non-polar, volatile organic substance is added to form a coordination compound with the desoxycholic acid in the solution, the steps of acidifying the mixture until crystallization of the desoxycholic coordination compound begins, continuing the acidification until an equilibrium pH is established, and then maintaining the pH slightly below said equilibrium pH to effect crystallization of the desoxycholic acid and separating the desoxycholic acid crystals.

ROBERT H. SIFFERD.

References Cited in the file of this patent

UNITED STATES PATENTS

| Number | Name | Date |
|---|---|---|
| 2,346,239 | Sifferd | Apr. 11, 1944 |

FOREIGN PATENTS

| Number | Country | Date |
|---|---|---|
| 105,769 | Great Britain | Dec. 11, 1919 |
| 582,772 | Great Britain | Nov. 27, 1946 |